(12) United States Patent
Adamczyk

(10) Patent No.: US 11,036,029 B2
(45) Date of Patent: Jun. 15, 2021

(54) CAMERA LENS, CAMERA AND METHOD OF LOCKING A FOCUS RING IN A CAMERA LENS

(71) Applicant: Hubert Adamczyk, Cracow (PL)

(72) Inventor: Hubert Adamczyk, Cracow (PL)

( * ) Notice: Subject to any disclaimer, the term of this patent is extended or adjusted under 35 U.S.C. 154(b) by 206 days.

(21) Appl. No.: 15/751,992

(22) PCT Filed: Aug. 8, 2016

(86) PCT No.: PCT/EP2016/068850
§ 371 (c)(1),
(2) Date: Feb. 12, 2018

(87) PCT Pub. No.: WO2017/029143
PCT Pub. Date: Feb. 23, 2017

(65) Prior Publication Data
US 2018/0231737 A1    Aug. 16, 2018

(30) Foreign Application Priority Data

Aug. 14, 2015  (EP) ..................... 15461553

(51) Int. Cl.
*G02B 7/10*  (2021.01)
*G02B 7/02*  (2021.01)
*G02B 15/14*  (2006.01)
*G02B 7/04*  (2021.01)
(52) U.S. Cl.
CPC .............. *G02B 7/10* (2013.01); *G02B 7/023* (2013.01); *G02B 7/04* (2013.01)

(58) Field of Classification Search
CPC . G02B 7/04; G02B 7/10; G02B 7/105; G02B 7/022; G02B 7/023; G02B 15/14
See application file for complete search history.

(56) References Cited

U.S. PATENT DOCUMENTS

| 4,488,787 A | 12/1984 | Osawa | |
| 2006/0072214 A1* | 4/2006 | Kawaguchi | G02B 7/00 359/704 |
| 2006/0262391 A1* | 11/2006 | Thomas | F41G 1/38 359/422 |
| 2007/0242940 A1* | 10/2007 | Yumiki | G02B 7/02 396/79 |
| 2011/0181970 A1 | 7/2011 | Aiba | |

FOREIGN PATENT DOCUMENTS

| JP | 2011-257782 A | 12/2011 |
| JP | 2011257782 A | * 12/2011 |

OTHER PUBLICATIONS

International Search Report Corresponding to PCT/EP2016/068850 dated Nov. 10, 2016.
Written Opinion Corresponding to PCT/EP2016/068850 dated Nov. 10, 2016.

* cited by examiner

*Primary Examiner* — William R Alexander
*Assistant Examiner* — Ephrem Z Mebrahtu
(74) *Attorney, Agent, or Firm* — Finach & Maloney, PLLC; Michael J. Bujold

(57) ABSTRACT

A camera lens (1) comprising at least one focus ring (2) to manually adjust a focus of the camera. The camera lens (1) further comprises at least one locking ring (3) comprising an outer ring (4). The locking ring (3) is adapted to be adjusted to lock the focus ring (2) in a specific position.

19 Claims, 5 Drawing Sheets

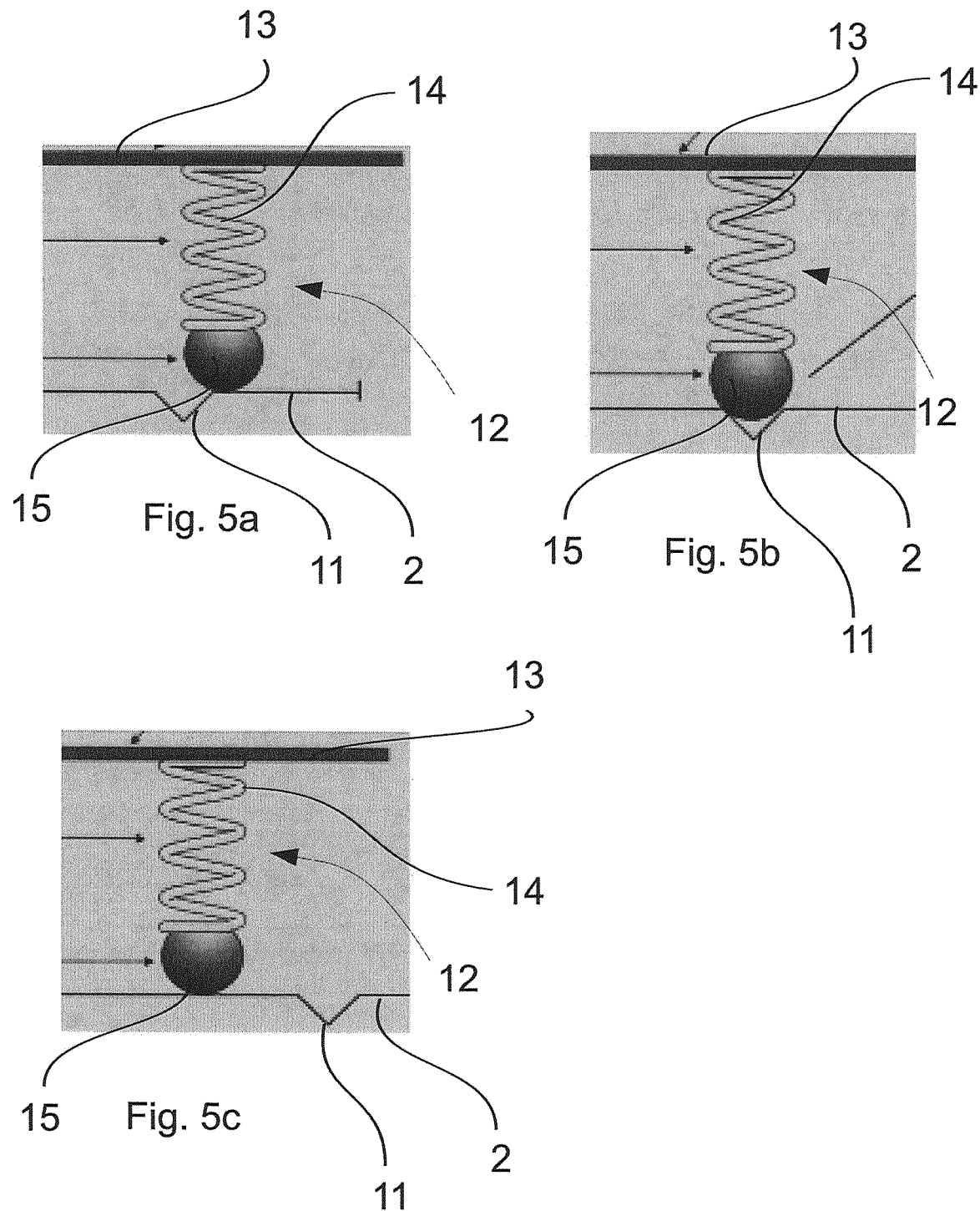

to devices and methods according to the independent claims.

CAMERA LENS, CAMERA AND METHOD OF LOCKING A FOCUS RING IN A CAMERA LENS

This application is a National Stage completion of PCT/EP2016/068850 filed Aug. 8, 2016, which claims priority from European application serial no. 15461553.8 filed Aug. 15, 2015.

FIELD OF THE INVENTION

The invention is directed to a camera lens, a camera and a method of locking a focus in a camera lens, in particular to devices and methods according to the independent claims.

BACKGROUND OF THE INVENTION

Camera lenses often comprise a manually adjustable focus ring. Through rotation of the focus ring, the focus of the camera lens can be adjusted. There are situations, however, where the focus is preferably not changed anymore. For example, if the focus ring is set to infinity to make landscape pictures, the focus should be locked in the infinity mode for all pictures taken from the landscape. In order to ensure that the focus ring is locked, a locking mechanism should be present avoiding an adjustment of the focus e. g. through an accidental rotation of the focus ring. Hence, there is a need of focus locks.

US 2011/0181970 A1 suggests providing a knob to lock a focus of a surveillance camera. The adjustable focus of the camera can be locked through tightening of the knob. When the focus ring locking knob is tightened, a distance between the knob body part and the focus ring is reduced and a cover is held between the knob body part and the focus ring. As a result, the focus ring is locked. The focus ring is unlocked by loosening the focus ring locking knob.

The system is not very useful for a daily use camera which is constantly on the move and a focus is much more often changed and locked compared to a static surveillance camera. Rotation of the knob is not easily achievable during the use of the camera. Further, the knobs are standing off from the lens and packing/unpacking of the camera might be hindered by the knob.

SUMMARY OF THE INVENTION

The present invention is thought to overcome the drawback of the prior art, in particular to provide a camera lens comprising a handy and compact means for locking the focus.

According to the invention, the problem is solved by the features of the independent claims. It is suggested to provide a camera lens comprising at least one ring to adjust a focus of the camera. Further, the camera lens comprises at least one locking ring with an outer ring, wherein the locking ring is adapted to be adjusted to lock the focus ring in a specific locking position.

In order to lock the focus ring in the specific position, the outer ring is changed from a non-locking position to a locking position. The change might be performed through rotation of the outer ring such as to move a friction providing element in engagement with the focus ring. Alternatively, the outer ring might be moved in an axial direction of the camera lens to fix the focus ring, e. g. through a friction connection or a form fit between the outer ring and the focus ring. It might also be possible to compress the outer ring onto the focus ring in order to loch the focus ring in its current position. In order to unlock the focus again, the locking ring might be moved in the contrary direction to change the locking ring from the locking position to the unlocking position.

By providing a further ring on the camera lens, a handy and compact solution is provided. The ring is easily accessible by the operator independently of the position of the hand on the camera lens. Therewith, the adjusted focus can be reliably locked and unlocked.

Preferably, the outer ring is arranged proximally to said at least one focus ring, i. e. nearer to the operator than the focus ring in axial direction of the camera lens.

In an alternative preferred solution, the outer ring is arranged distally to said at least one focus ring, i. e. further away from the operator than the focus ring in axial direction of the camera lens.

By providing the outer ring proximally or distally of the focus ring, a simple solution is provided. During operation, the operator might adjust the focus. The operator might then intend to lock the focus. In order to lock the focus, the operator might just move his hand slightly proximally or distally from the focus ring onto the outer ring. The focus can then be locked by changing the locking ring from the non-locking position to the locking position.

The at least one locking ring preferably farther comprises an inner ring. The outer ring is preferably adapted to be rotated in order to move said inner ring in a direction towards said at least one focus ring in order to provide a frictional connection between the inner ring and the at least one focus ring.

The locking through rotation provides a handy solution. The operator is used to rotate rings on the lens in order to e. g. adjust the focus or the zoom. By providing a rotatable outer ring of a locking ring, the operator just needs to rotate to outer ring in one direction in order to lock the focus and in the other direction to unlock the focus.

By rotation of the outer ring, an inner ring is moved in the direction towards the focus ring. If the inner ring is arranged proximally or distally to the focus ring, the inner ring is moved axially in a direction of the lens to provide the friction connection.

Alternatively, the inner ring might be arranged coaxially to the focus ring, and rotation of the outer ring will move the inner ring transversely to the axial direction towards the focus ring in order to provide a frictional connection.

Instead of a frictional connection, the inner ring might also assume a form fit with a corresponding part of the focus ring in order to fix the focus ring in its current position.

Preferably the inner ring is adapted to be moved in an axial direction of the camera lens.

The inner ring might therefore comprise extending elements soon as a pin arranged in a thread of the outer ring. Rotation of the outer ring will then move the inner ring in an axial direction of the camera lens.

The inner ring preferably comprises and more preferably is made of a material which cause friction The inner ring might e. g. comprises or is made of plastics or metals such as e. g. aluminum.

Preferably, the lens comprises an indication of a direction to be moved in order to lock said focus ring.

By providing an indication on the lens, the operator knows how to move the outer ring in order to change the locking ring from a locking to an unlocking position. The indication might be applied directly on the outer ring. Alternatively, the indication might be on other parts of the lens.

The outer ring preferably comprises a locking and/or unlocking indication. The indication is adapted to act together with a further indication of another part of the lens, such that a locked and/or unlocked position of the focus ring is indicated.

The terms "lock(ed)" and/or "unlock(ed)" or corresponding symbols might be written on a specific portion of the outer ring. An adjoining fixed portion of the lens might comprise the indication in the form of a line or the like. The term "lock" and/or "unlock" is preferably positioned on the outer ring such that when the possible terra "lock" is lying directly next to the line, the focus is in a locked position, and when the possible term "unlock" is lying directly next to the line, the focus is completely unlocked.

The further indication might be a separate indication. If the indication indicating the direction is arranged on a different part than the outer ring, the direction indication might also act as a further indication acting in combination with the locking/unlocking indication.

Alternatively, the status of the focus might be indicated electronically. There might e. g. be a colored light glowing in the locked position and therewith indicating that the focus is locked. Additionally or alternatively, there might be an interface between the lens and a camera body for transmitting a signal indicating the status and activating appropriate displays in the camera.

With an indication, the operator can easily recognize the status of the camera lens.

The outer ring preferably comprises and more preferably is made of the same material as the outer surface of the camera lens, i. e. a plastic.

The outer ring might in an alternative preferred option comprise and more preferably is made of a metal.

Metal is easily tactilely distinguishable from e. g. a harder plastic of the focus ring. Therewith, the outer ring might be easily found without having to look on the lens.

In an alternative preferred embodiment, the outer ring comprises an outer rubber layer. Also rubber is easily tactilely distinguishable from plastics and avoids slipping of the hand of the operator.

The invention is further directed to a camera lens comprising a focus ring to manually adjust a focus of the lens, preferably a camera lens as described hereinabove. The focus ring comprises an element at an inner surface. The lens comprises a counter element. The element and the counter element are adapted to provide a feedback to the operator if said focus ring is adjusted to a specific position. The feedback is preferably a tactile feedback.

When the focus ring is adjusted through rotation, the element is also rotated. When the element is rotated to a position where the counter element is arranged, the element and the counter element will engage in an operative connection to provide the user with a feedback that the specific position is achieved.

The element and the counter element are preferably arranged such that the feedback is provided when the focus is set on infinity. Therewith, the operator receives the information that the focus is set on infinity without a need for looking on a scale of the focus.

The counter element is preferably arranged on a rotatably fixed inner ring. The inner ring is arranged concentrically to said focus ring.

A rotatably fixed inner ring is often part of a lens of a camera. By providing the counter element on sued a ring, there is no need for providing a separate part to attach the counter element.

Alternatively, the counter element is attached to a separate part arranged inwardly of the focus ring.

The element is preferably a notch and the counter element is preferably a spring.

In such an arrangement, the spring will enter the notch if the focus is rotated to bring the notch and the spring into operative connection. When the spring enters the notch, a tactile feedback is provided to the user in the form of a knock.

Alternatively, the spring might form the element and the notch the counter element.

Further alternatively, the element and the counter element might e. g. be provided as pins which will contact each other as soon as the focus ring is rotated in the specific position.

If the counter element or the element is constructed as a spring, the spring preferably comprises a ball adapted to enter the notch.

The entering of the ball in the notch provides a stronger feedback, as more force is into the notch. Therewith, the position is more reliably recognized by the operator.

Alternatively, the spring might comprise an element in another form than a ball, e. g. a cube to enter the notch.

The invention is further directed to a camera comprising a camera lens as described hereinbefore.

Further, the invention is directed to a method of using a camera and locking a focus ring in a camera lens. The method comprises the steps of moving an outer ring of a locking ring of the camera lens to lock a focus ring in a specific position.

Preferably the outer ring is rotated in order to lock said focus ring.

The locking ring preferably further comprises an inner ring. The inner ring is moved in the direction towards the focus ring by rotating the outer ring to provide a frictional connection between the inner ring and the focus ring.

Preferably, the inner ring is moved in an axial direction of the camera lens in order to lock the focus ring.

BRIEF DESCRIPTION OF THE DRAWINGS

Further preferred arrangements of the invention are described with reference to the following described embodiments and the schematic figures.

The figures schematically show:

FIGS. 5a-5c: A rotational feedback mechanism according to the invention in different states.

DETAILED DESCRIPTION OF THE PREFERRED EMBODIMENTS

Figure 1:
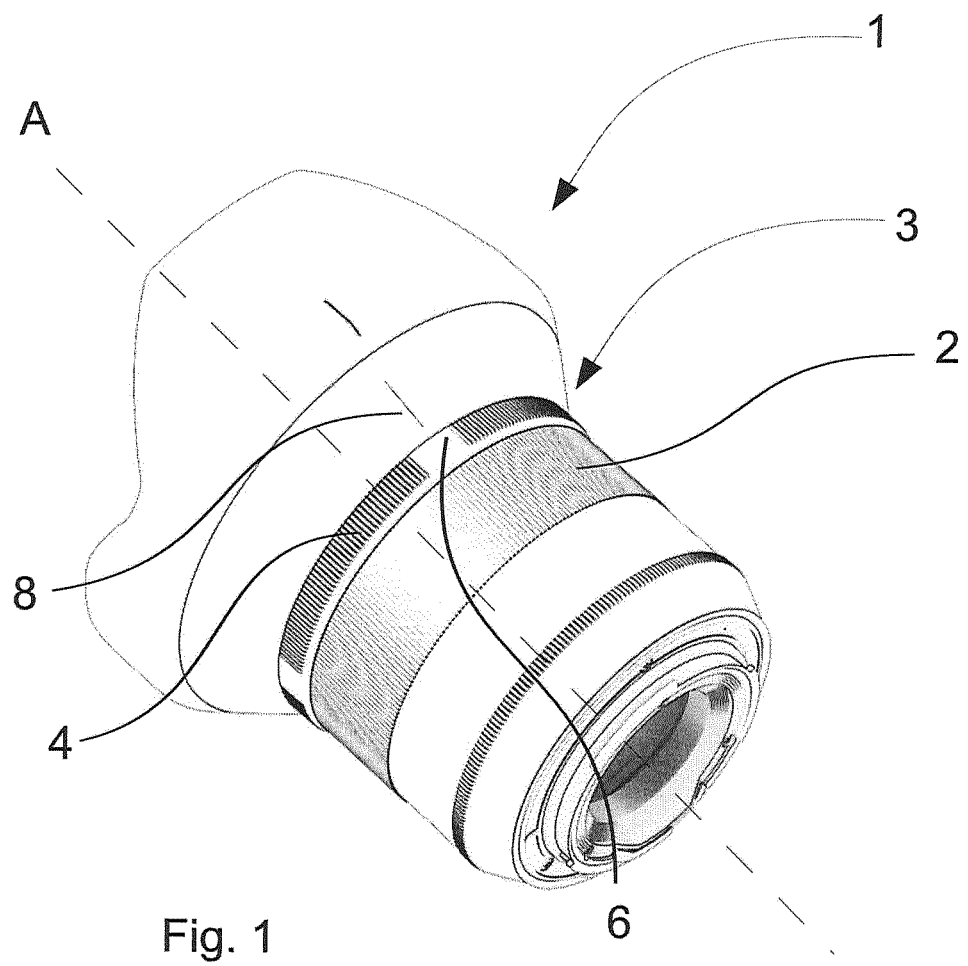
FIG. 1: A camera lens according to a first embodiment of the invention.

FIG. 1 shows a camera lens 1 according to a first embodiment of the invention. The lens 1 comprises a focus ring 2 to manually adjust the focus. The lens 1 further comprises a locking ring 3 with an outer ring 4. The outer ring is manually rotatable in order to lock the focus ring 2 in a specific position.

The outer ring 4 further comprises a lock indication 6 in the form of a small box comprising the term "lock". A further indication 8 in the form of a line is arranged on a proximally adjacent, fixed part of the lens. When the lock indication 6 is next to the line, the focus ring 2 is in the locked position. With the line and the box, the locked status is indicated to the operator. A further box (not shown) is arranged on the outer ring comprising the term "unlocked". The further box acts also together with the indication 8, indicating that the focus ring is in a totally unlocked state.

Through rotation of the outer ring 4, an inner ring (not shown) is moved in an axial direction A of the lens to lock the focus ring 2. The inner ring has a pin arranged in a thread of an inner wall of the outer ring 4 to be moved axially by rotation of the outer ring 4. The inner ring will be moved in a frictional connection with the focus ring 2 to lock the position of the focus ring 2.

Figure 2:
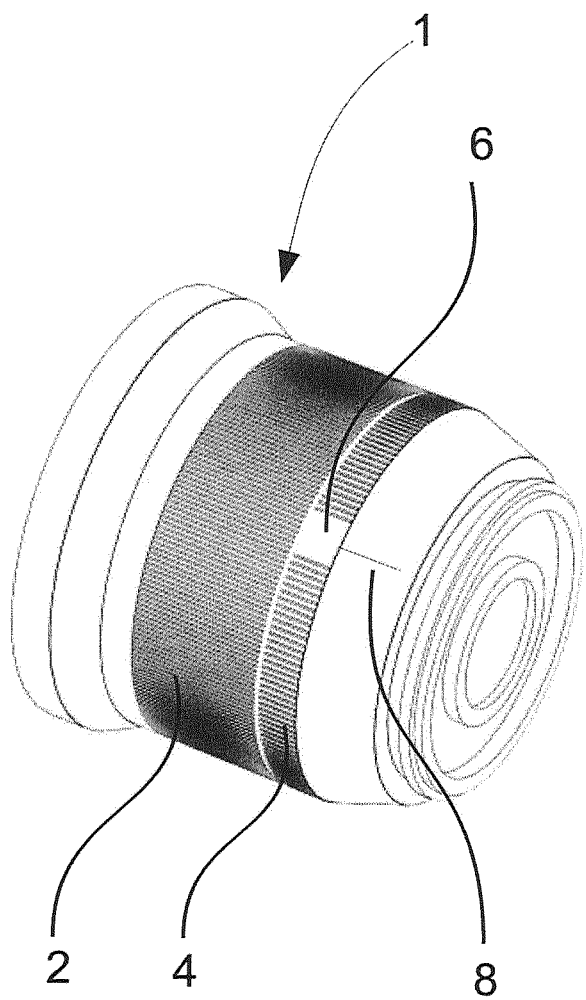
FIG. 2: A camera lens according to a further embodiment of the invention

The embodiment of FIG. 2 is similar to the embodiment of FIG. 1. However, the outer ring 4 is arranged distally to the focus ring 2. The indication 8, is arranged on a distally adjacent, fixed portion of the camera lens 1. The indication 8 acts together with the indications 6 and a further indication (not shown) of the outer ring 4 to indicate the current status of the focus ring 2.

Figure 3A:
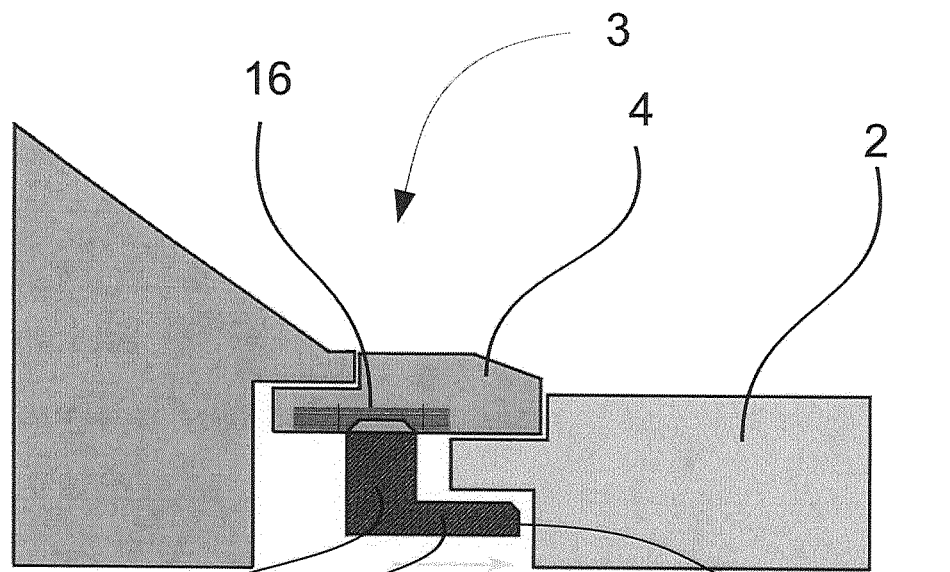
FIG. 3a and A detailed view of the locking mechanism according 3b: to the invention in a looked and an unlocked state
Figure 3B:
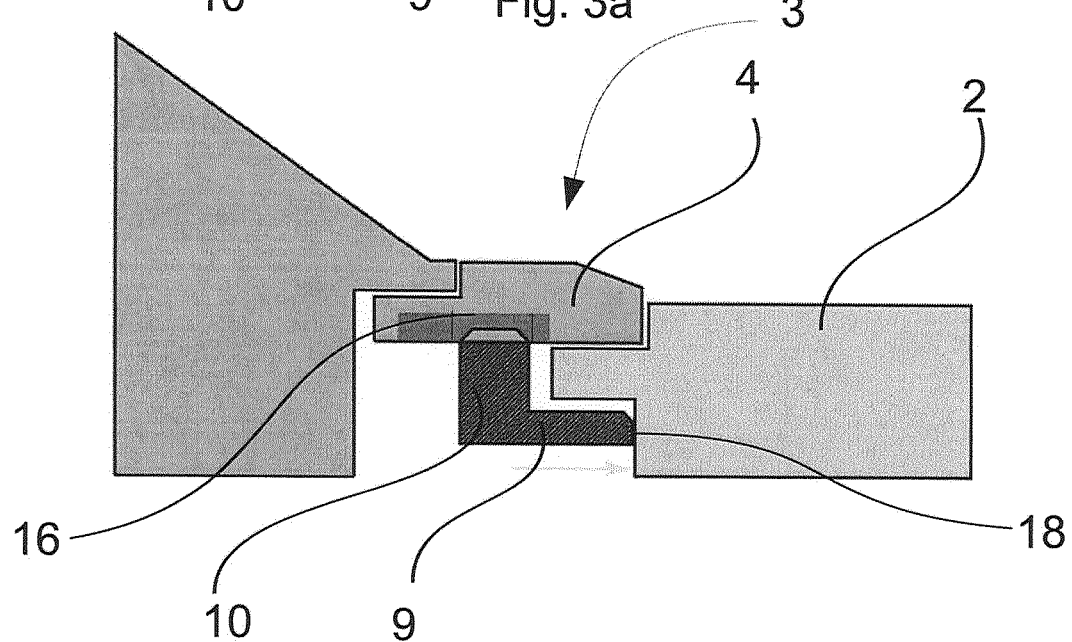

FIGS. 3a and 3b are a detailed view of the locking mechanism in a locked state (FIG. 3b) and an unlocked state (FIG. 3a). An inner ring 9 of the locking ring 3 is movable in the direction of the focus ring 2 (indicated with an arrow) through rotation of the outer ring 4 of the locking ring 3. A pin 10 of the inner ring 9 engages with a helical structure 16 of the outer ring 4. When the outer ring 4 is rotated, the pin 10 will be guided in the helical structure 16. The ring is guided with a two linear guides 17 (see FIG. 4). Therewith, the inner ring 9 is linearly moved towards the focus ring 2, when the outer ring 4 is rotated. When the outer ring 4 is in a locking position, on the surface 18 of the inner ring 9 is in a frictional connection with the focus ring 2 (FIG. 3b). The focus ring is locked as a result of the frictional connection between surface 18 of the inner ring 9 and the focus ring, therewith prohibiting a rotation of the focus ring 2. The surface 18 might comprise a vertical and a horizontal edge to cause stronger friction.

Figure 4:
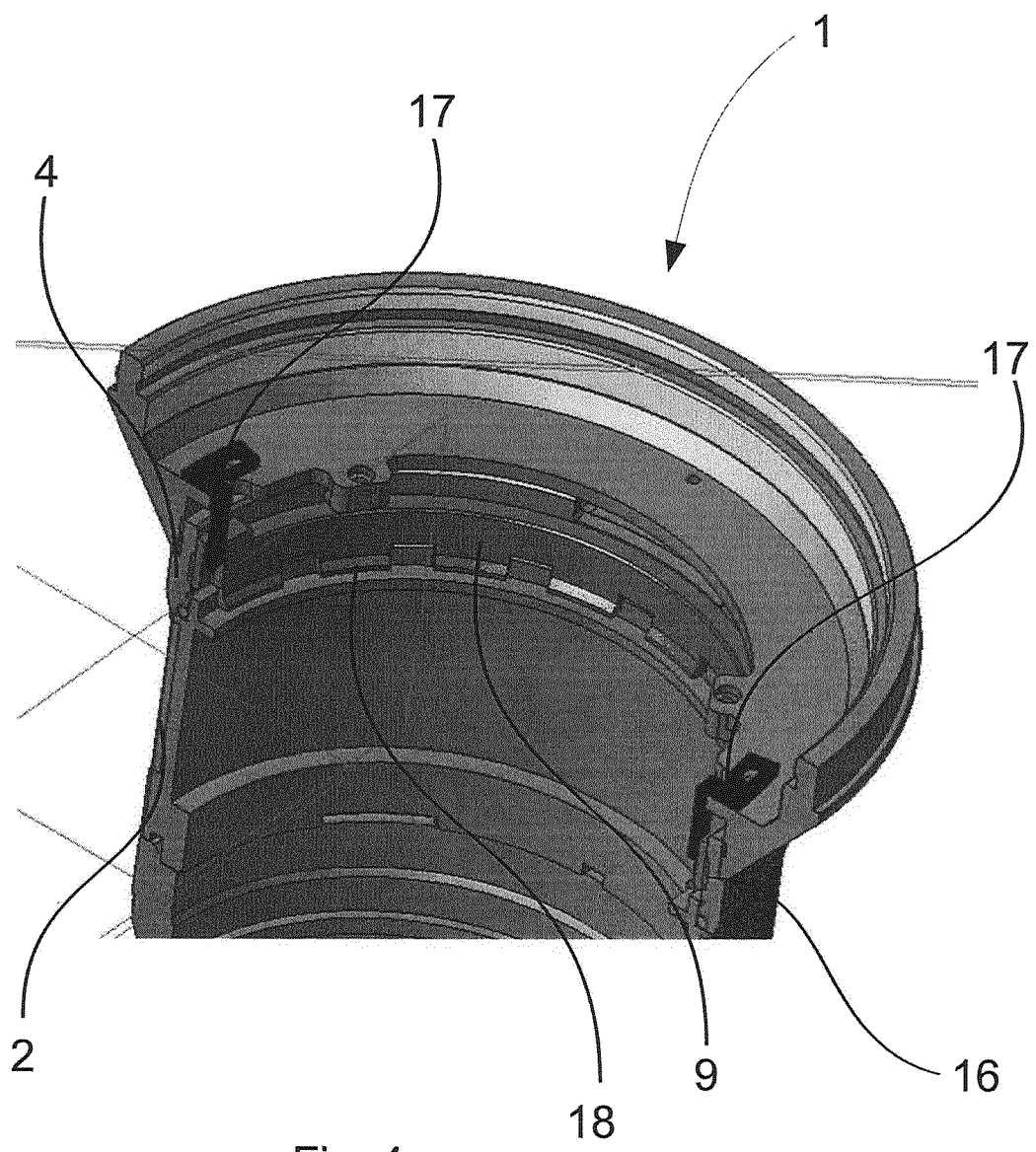
FIG. 4: A locking mechanism according to the invention in a 3D view.

FIG. 4 is a further view on the locking mechanism of FIG. 3. The inner ring 3 is guided with two linear guides 17 arranged opposite each other. The surface 18 of the inner ring 9 has a stepped profile, such that only some parts of the surface will enter into a frictional force with the focus ring 2. A stepped profile allows a better frictional connection between the surface 18 and the focus ring 2. Further, the stepped profile prevents ring lamming because the frictional forces are better distributed over the surface. By rotation of the outer ring 4 the inner ring 9 will be guided linearly along the linear guides 17.

FIG. 5 schematically shows a feedback mechanism according to the invention. The focus ring comprises an element 11 in the form of a notch on an inner surface. A rotatably fixed inner ring 13 is arranged concentrically with the focus ring 2. An element 12 comprising a spring 14 and a ball 15 is arranged on the rotatably fixed inner ring 13. The notch and the element 12 are arranged such that the ball 15 will enter the notch when the focus ring 2 is set to an infinity focus. To change the focus, the focus ring 2 is rotated. During rotation, the ball 15 will move along the inner surface of the outer ring 2. The FIGS. 5a-5c show schematically different positions of the ball 15 as a result of rotation of the focus ring 2. When the ball enters the notch in an infinity focus, a tactile feedback in she form of a click is provided, to the operator (FIG. 5b). Therewith, the operator knows that the focus has been set to infinity without the need for an optical check.

The invention claimed is:

1. A camera lens comprising:
    at least one focus ring for manually adjusting a focus of said lens, and
    at least one locking ring comprising an outer ring,
    wherein the locking ring is adapted to be adjusted to lock the focus ring in a specific position, wherein said at least one locking ring further comprises a single piece inner ring, having a ring symmetry with respect to optical axis, and the outer ring is adapted to be rotated in order to move said inner ring in a direction towards said at least one focus ring in order to provide a connection between said inner ring and said at least one focus ring, wherein said inner ring comprises a pin which engages with a helical structure of the outer ring.

2. The camera lens according to claim 1, wherein said outer ring is arranged proximally to said at least one focus ring.

3. The camera lens according to claim 1, wherein said outer ring is arranged distally to said at least one focus ring.

4. The camera lens according to claim 1, wherein the connection between said inner ring and said at least one focus ring is a frictional connection.

5. The camera lens according to claim 1, wherein said inner ring is adapted to be moved in an axial direction of the camera lens.

6. The camera lens according to claim 1, wherein said lens comprises an indication of a direction to be moved in order to lock said focus ring.

7. The camera lens according claim 1, wherein said outer ring comprises a locking and/or unlocking indication adapted to act together with a further indication of another part of the lens such that a locked position and/or an unlocked position of the focus ring is indicated.

8. The camera lens according to claim 1, wherein said outer ring comprises metal.

9. The camera lens according to claim 8, wherein said outer ring is made of metal.

10. The camera lens according to claim 1, wherein said outer ring comprises an outer rubber layer.

11. A camera lens according to claim 1, wherein said focus ring comprises an element at an inner surface and said lens comprises a counter element arranged inwardly to said focus ring, and said element and said counter element are adapted to provide a feedback to an operator if said focus ring is adjusted to a specific position.

12. The camera lens according to claim 11, wherein said element and said counter element are adapted to provide tactile feedback.

13. The camera lens, according to claim 11, wherein said counter element is arranged on a rotatably fixed inner ring, and said rotatably fixed inner ring is arranged concentrically to said focus ring.

14. The camera lens according to claim 11, wherein said element comprises a notch and said counter element comprises a spring adapted to enter said notch.

15. The camera lens according to claim 14, wherein said counter element further comprises a ball fixed to said spring, and the ball is adapted to enter said notch.

16. A camera comprising a camera lens according to claim 1.

17. A camera comprising a camera lens according to claim 11.

18. A method of locking a focus ring in a camera lens, the method comprising:

moving an outer ring of a locking ring of the camera lens to lock a focus ring in a specific position, further comprising rotation said outer ring in order to lock said focus ring, wherein said locking ring further comprises single piece inner ring, having a ring symmetry with respect to optical axis and wherein said inner ring comprises a pin which engages with a helical structure of the outer ring, wherein in order to lock said inner ring is moved in the direction of said focus ring by rotating said outer ring to provide a frictional connection between said inner ring and said focus ring.

19. The method according to claim 18, further comprising moving said inner ring in an axial direction of the camera lens.

* * * * *